United States Patent [19]

Burba, III

[11] Patent Number: 4,477,367

[45] Date of Patent: * Oct. 16, 1984

[54] CRYSTALLINE 2-LAYER LITHIUM-HYDROXY ALUMINATES

[75] Inventor: John L. Burba, III, Angleton, Tex.

[73] Assignee: The Dow Chemical Company, Midland, Mich.

[*] Notice: The portion of the term of this patent subsequent to Sep. 7, 1999 has been disclaimed.

[21] Appl. No.: 412,613

[22] Filed: Aug. 30, 1982

Related U.S. Application Data

[63] Continuation-in-part of Ser. No. 217,614, Dec. 18, 1980, Pat. No. 4,348,295.

[51] Int. Cl.$^3$ .................... B01D 15/04; C01D 15/00; C08D 5/20
[52] U.S. Cl. ...................... 252/184; 521/28; 423/179.5; 423/181; 502/25; 502/402; 502/414; 502/415; 502/514
[58] Field of Search ................ 502/25, 402, 414, 415, 502/514; 423/179.5, 181; 252/184; 521/28

[56] References Cited

U.S. PATENT DOCUMENTS

| | | | |
|---|---|---|---|
| 4,116,856 | 9/1978 | Lee et al. | 423/181 X |
| 4,116,857 | 9/1978 | Lee et al. | 423/181 X |
| 4,116,858 | 9/1978 | Lee et al. | 252/184 |
| 4,159,311 | 6/1979 | Lee et al. | 423/179.5 |
| 4,221,767 | 9/1980 | Lee et al. | 423/179.5 |
| 4,291,001 | 9/1981 | Repsher et al. | 423/179.5 |
| 4,347,327 | 8/1982 | Lee et al. | 521/28 |
| 4,348,295 | 9/1982 | Burba | 252/184 |
| 4,348,296 | 9/1982 | Bauman et al. | 252/184 |
| 4,348,297 | 9/1982 | Bauman et al. | 423/179.5 X |
| 4,376,100 | 3/1983 | Lee et al. | 423/179.5 |

Primary Examiner—Benjamin R. Padgett
Attorney, Agent, or Firm—W. J. Lee

[57] ABSTRACT

Crystalline 2-layer $LiOH.2Al(OH)_3.nH_2O$, preferably supported by a porous substrate, is prepared by treating crystalline 2-layer $LiX.2Al(OH)_3.nH_2O$, where X is anion, with a LiOH solution or other hydroxide ion source. The so-formed crystalline 2-layer $LiOH.2Al(OH)_3.nH_2O$ is particularly suitable for exchange of the OH ion with larger X' ions to produce other crystalline 2-layer $LiX'.2Al(OH)_3.nH_2O$.

9 Claims, No Drawings

CRYSTALLINE 2-LAYER LITHIUM-HYDROXY ALUMINATES

CROSS-REFERENCE TO RELATED APPLICATIONS

This is a continuation-in-part application of copending application Ser. No. 217,614, filed Dec. 18, 1980 (now U.S. Pat. No. 4,348,295), which teaches preparations of 2-layer and 3-layer lithium aluminates, with and without substrates such as ion exchange resins.

Another copending application, Ser. No. 217,611 filed Dec. 18, 1980 (now U.S. Pat. No. 4,348,296), also discloses preparation of 2-layer and 3-layer lithium aluminates on various substrates.

BACKGROUND OF THE INVENTION

U.S. Pat. No. 4,116,858 and U.S. Pat. No. 4,159,311, disclose that an ion exchange resin may be saturated with aqueous $AlCl_3$ solution and that reaction with $NH_4OH$ converts the $AlCl_3$ in situ to $Al(OH)_3$. This so-formed amorphous $Al(OH)_3$ is then reacted with LiX, where X is halide, at elevated temperature to form crystalline $LiX.2Al(OH)_3$ which is useful in selectively recovering $Li^+$ values from aqueous solutions, e.g., Li-containing brines.

U.S. Pat. No. 4,116,856 and U.S. Pat. No. 4,221,767 disclose that improvements in the above discussed formation of crystalline $LiX.2Al(OH)_3$ are found by reacting amorphous $Al(OH)_3$, or crystalline hydrous alumina (e.g., norstrandite, bayerite, gibbsite or mixtures of these) with LiOH to form $LiOH.2Al(OH)_3 \cdot nH_2O$ which is then reacted with LiX to form the crystalline $LiX.2Al(OH)_3$, where X is halide.

Various forms of alumina, $Al_2O_3$, are known, some of which occur as natural minerals, some of which are hydrated, and some of which are crystalline. The Handbook of Chemistry shows the following:

| Name | Crystalline Form | M.P. °C. |
|---|---|---|
| aluminum oxide, $Al_2O_3$ | hex. col. | 2050 |
| $\alpha$-$Al_2O_3$, corundum | trig; col. cr, n | 2015 |
| $\gamma$-$Al_2O_3$, $\gamma$-alumina | wh. micro. cr., n | tr. to alpha |
| $Al_2O_3.3H_2O$, gibbsite, (hydrargillite) | monocl., wh. cr. | tr. to $Al_2O_3.H_2O$ (Boehmite) |
| $Al_2O_3.3H_2O$, bayerite | wh. micro. cr | tr. to $Al_2O_3.H_2O$ (Boehmite) |
| aluminum oxide, $Al_2O_3.xH_2O$ | amor. wh. pwd. | -$xH_2O$, tr. to $\gamma$-$Al_2O_3$ |

Norstrandite is a crystalline hydrous alumina, as are gibbsite and bayerite.

The present disclosure is believed to be most closely related to the above-identified patents and the patents are incorporated by reference in their entirety here. The teachings in U.S. Pat. No. 4,116,856 are particularly relevant where it discloses that crystalline hydrous alumina (e.g., norstrandite and/or bayerite) dispersed in ion exchange resin is not converted back to its original $LiX.2Al(OH)_3 \cdot nH_2O$ form by treatment with LiX unless the hydrous alumina is first, or simultaneously, reacted with LiOH. I have found, however, that crystalline hydrous aluminas can be reacted directly with lithium salts to form crystalline lithium salt aluminates if the correct ranges of temperature and concentration are employed. I have also found that 2-layer lithium aluminate can be regenerated, without conversion to gibbsite, by employing an aqueous wash containing at least about 800 ppm. $Li^+$. I have further found that crystalline 2-layer $LiOH.2Al(OH)_3 \cdot nH_2O$ can be prepared by treating crystalline 2-layer $LiX.2Al(OH)_3 \cdot nH_2O$ with LiOH.

SUMMARY OF THE INVENTION

Crystalline 2-layer $LiOH.2Al(OH)_3 \cdot nH_2O$ is prepared by treating crystalline 2-layer $LiX.2Al(OH)_3 \cdot nH_2O$ with hydroxyl ions. This novel form of crystalline 2-layer $LiOH.2Al(OH)_3 \cdot nH_2O$ is particularly suitable for exchange of the $OH^-$ ion with larger anions to produce other 2-layer crystalline lithium aluminates.

DESCRIPTION OF THE INVENTION

Crystalline hydrous aluminas are reacted with lithium salts under the influence of elevated temperature and sufficient concentration to form lithium aluminates, designated here as $LiX.2Al(OH)_3 \cdot nH_2O$ where X is an anion characterized as an anion which will form acids when in molecular combination with hydrogen or will form salts when in molecular combination with metal ions. It will be understood, of course, that the lithium aluminates will normally contain some waters of hydration, designated as $nH_2O$ in the above formula. The anion may have a valence of 1, 2, or 3.

When the beginning hydrous alumina is amorphous, such as when freshly prepared by ammonia precipitation of $Al(OH)_3$ from an $AlCl_3$ solution, the reaction to form lithium aluminates may be done using relatively weak solutions of the lithium salt (up to about 10%) and at relatively low temperatures (e.g., 20° C.–40° C.), then when heated at, e.g., about 50° C. or higher, the lithium aluminate becomes crystallized as a 3-layer crystal.

However, when the beginning hydrous alumina is crystalline (such as bayerite, gibbsite, norstrandite, or boehmite), then the relatively low temperature treatment with lithium salt does not appear to form an appreciable amount (if any) of lithium aluminate within a reasonable length of time.

It has now been found, surprisingly, that when heated at elevated temperature of preferably about 85° C.–120° C., the mixture of crystalline hydrous alumina and lithium salt forms lithium aluminate. Along with this higher temperature, it is necessary that the lithium salt solution be of a relatively high concentration, preferably above about 12%, most preferably above about 20% or may be at the saturation limit of the lithium salt, especially if it is only slightly soluble. The combination of high temperature and high concentration is particularly effective in forcing the lithium salt into the layers of the hydrous alumina crystals, which in some cases gives a crystallographic unit cell having two layers of lithium salt and two layers of hydrous alumina and in other cases gives a crystallographic unit cell having three layers of lithium salt and three layers of hydrous alumina.

As used herein, the expressions "2-layer" and "3-layer" refer to the number of layers bounded on both sides by the aluminate layers into which the subject Li compounds are intercalated. It will be realized, of course, that the crystals of lithium aluminates are normally present as aggregates or stacks of a plurality of unit cells rather than each unit cell standing as a separate physical entity.

The lithium aluminates discussed here have two crystal structures, viz those of 2-layer crystallographic unit cells and those of 3-layer crystallographic unit cells. The 3-layer lithium aluminates have a 3-fold screw axis oriented parallel to the c-axis of the lithium aluminate crystal. The 2-layer lithium aluminates have a 2-fold axis of rotation oriented parallel to the c-axis, as determined by the x-ray crystal studies.

For purposes of discussion and description in this disclosure, 2-layer lithium aluminates and 3-layer lithium aluminates are graphically illustrated as follows:

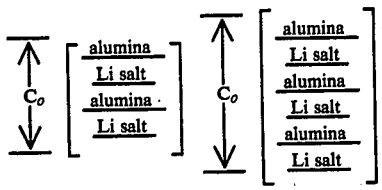

The heating of the mixture of lithium salt and hydrous alumina crystals may be performed in an open vessel, in a closed vessel, or at reflux. If performed in an open vessel where water vapor can escape, or if reduced pressure is applied to remove water vapor, the resulting increase in concentration of the lithium salt is beneficial in that the higher concentration tends to help drive the lithium salt into the alumina layers.

In those instances wherein water vapor is allowed to escape, a low concentration (generally less than about 10%) lithium salt may be employed at the outset, then the increase in concentration which results from water loss can be sufficient to drive the lithium salt into the hydrous alumina.

The preferred lower ratio of lithium salt to hydrous alumina, $Al(OH)_3$, in the mixture is about 0.5 moles of Li to 1 mole of Al. The upper limit of Li to Al is the saturation point of the lithium salt solution.

The lithium salts for reaction with the hydrous alumina can be at least one of the group exemplified by LiCl, LiBr, LiI, $LiNO_3$, $LiClO_4$, LiClO, LiSCN, LiOOCH, $LiC_2H_3O_2$, and the like. Stated another way the X in LiX may be any anion of a halo acid (excluding F), a mineral acid or inorganic acid, or an organic acid which is stable under reaction conditions. Virtually any water soluble lithium salt would be expected to be within the purview of this invention so long as the anion is not so large as to preclude entering the interstices of the alumina crystal.

The 2-layer variety of lithium aluminate is a novel composition and is prepared by reaction of lithium salt with gibbsite. Reaction of lithium salt with other forms of hydrous alumina, such as bayerite or norstrandite, produces 3-layer lithium aluminates. It is not possible to convert 2-layer lithium aluminate to 3-layer lithium aluminate without completely solubilizing the lithium aluminate to re-precipitate it as 3-layer.

The 2-layer $LiCl.2Al(OH)_3.nH_2O$ crystal, whether in neat form or supported on or within a substrate, exhibits different behavior in $H_2O$ than does the 3-layer variety. When reacted with $H_2O$ the 2-layer $LiCl.2Al(OH)_3.nH_2O$ decomposes to LiCl and gibbsite with the equilibrium LiCl concentration of about 0.14 moles of $Li^+$ per liter of solution, whereas the 3-layer $LiCl.2Al(OH)_3.nH_2O$ crystal is stable in $H_2O$ if there is as much as about 50 ppm $Li^+$ in the solution.

The 2-layer $LiX.2Al(OH)_3.nH_2O$ can be reacted with LiOH, or other hydroxide ion source, to form 2-layer $LiOH.2Al(OH)_3.nH_2O$; this can then be neutralized with an acid to form 2-layer lithium aluminate containing anions of the acid. Likewise 3-layer $LiOH.2Al-(OH)_3.nH_2O$ can be neutralized with an acid to form 3-layer lithium aluminate containing anions of the acid.

The porous substrate into which the crystalline hydrous alumina can be loaded may be an inert material, such as an inorganic or organic material. For certain uses and reasons, the substrate is preferably a macroporous resin such as an ion exchange resin as taught in U.S. Pat. No. 4,116,858 and U.S. Pat. No. 4,116,856.

The present disclosure encompasses the regeneration of 2-layer crystalline $LiX.2Al(OH)_3.nH_2O$, where X is halide, preferably chloride, when said 2-layer crystals are contained within an ion exchange resin, thereby forming a composite useful for removing $Li^+$ ions from solution. It has been found that an aqueous leaching used in regenerating the crystal will destroy the 2-layer crystal structure unless the leaching solution contains at least about 800 ppm $Li^+$ ion, preferably at least about 1000 ppm; the temperature of the leaching solution is preferably in the range of about 70° C. to about 100° C. If the $Li^+$ ions are the result of dissolving LiCl in water, then a $Li^+$ ion concentration of about 800 ppm is equivalent to about 4888 ppm of LiCl; a $Li^+$ ion concentration of about 1000 ppm is equivalent to about 6110 ppm of LiCl.

If a leaching solution is used which contains substantially less than about 800 ppm $Li^+$ ion concentration, then the 2-layer crystal structure may be substantially destroyed and when the hydrous alumina is rejuvenated by use of LiCl and/or LiOH (or NaOH) along with heating, the crystal reforms as a 3-layer crystal.

In converting crystalline 2-layer $LiX.2Al(OH)_3.nH_2O$ to crystalline 2-layer $LiOH.2Al(OH)_3.nH_2O$ by using LiOH solution (or other hydroxide ion source), the concentration of the LiOH solution (or other hydroxide ion) may be in the range of very dilute to very concentrated, preferably about 5% to about saturation; the temperature should be in the range of about 0° C. to about 100° C., preferably about 15° C. to about 70° C. Temperatures above 70° C. tend to solubilize the aluminate and should be avoided, especially if the hydroxide solution is concentrated. The novel crystalline 2-layer $LiOH.2Al(OH)_3.nH_2O$ is not prepared directly from $Al(OH)_3$, whether crystalline or amorphous, because LiOH solubilizes the $Al(OH)_3$ and subsequent $LiOH.2Al(OH)_3.nH_2O$ crystallized therefrom by heating is of the 3-layer variety.

One may convert, for example, 2-layer $LiCl.2Al(OH)_3.nH_2O$ to 2-layer $LiOH.2Al(OH)_3.nH_2O$ which can be reacted with HX' to form 2-layer. $LiX'.2Al(OH)_3.nH_2O$ where X' is a larger anion than $Cl^-$ or $OH^-$.

The examples which follow are to illustrate particular embodiments; the invention is not limited to the particular embodiments illustrated, but is limited only by the claims.

EXAMPLE 1

A 50-gram portion of gibbsite is reacted with 200 ml of 20% LiCl solution at 115° C. for about 2 hours. The product obtained is 2-layer $LiCl.2Al(OH)_3.nH_2O$ as determined by x-ray diffraction data.

EXAMPLE 2

A 200-ml portion of a macroporous ion exchange resin in bead form (DOWEX MWA-1, a Trademark of The Dow Chemical Company) containing gibbsite within its pores is reacted with about 500 ml of 20% LiCl solution at about 105° C. under reflux for about 2-3 hours. The reaction product obtained is 2-layer LiCl.2Al(OH)$_3$.nH$_2$O as determined by x-ray diffraction data.

EXAMPLE 3

A 200-ml portion of the same resin as in Example 2 above, but containing bayerite within its pores, is reacted with about 500 ml of 20% LiCl solution at about 105° C. under reflux for about 2-3 hours. The reaction product obtained is 3-layer LiCl.2Al(OH)$_3$.nH$_2$O as determined by x-ray diffraction data.

EXAMPLE 4

About 200 ml of the same resin as above, but containing norstrandite within its pores, is refluxed with about 500 ml of 20% LiCl solution for about 2-3 hours. The reaction product obtained is 3-layer LiCl.2Al(OH)$_3$.nH$_2$O as determined by x-ray diffraction data.

EXAMPLE 5

About 10 grams of 2-layer LiCl.2Al(OH)$_3$.nH$_2$O is repeatedly washed with 1% LiOH solution at room temperature until no Cl$^-$ is detected in the filtrate by AgNO$_3$ test. Analysis data from x-ray diffraction shows the material is 2-layer LiOH.2Al(OH)$_3$.nH$_2$O.

The 2-layer LiOH.2Al(OH)$_3$.nH$_2$O is titrated with CH$_2$CHCO$_2$H, acrylic acid, to a pH of 5. X-ray diffraction data confirms a 2-layer crystalline structure of Li(CH$_2$CHCO$_2$).2Al(OH)$_3$.nH$_2$O.

Another portion of crystalline 2-layer LiOH.2Al(OH)$_3$.nH$_2$O is reacted with trichloroacetic acid, titrated to acid pH. X-ray diffraction data confirms a 2-layer crystalline structure of Li(CCl$_3$CO$_2$).2Al(OH)$_3$.nH$_2$O.

EXAMPLE 6

A composite of 2-layer lithium aluminate/resin is prepared by reacting DOWEX MWA-1 ion exchange resin, containing gibbsite in the pores, with a 20% aqueous solution of LiCl at about 105° C. The composite is prepared for use as a Li$^+$ value absorber by substantially "unloading" (i.e., regenerating) Li$^+$ values from the crystal by washing it with a 1000 ppm Li$^+$ solution at 90° C. The so-regenerated composite is useful for extracting Li$^+$ values from a Li$^+$-containing natural brine (Smackover brine) until the 2-layer crystal is again loaded with Li$^+$ values. Regeneration with 1000 ppm Li$^+$ solution at 90° C. creates no gibbsite, indicating the 2-layer crystal remains intact. In contrast thereto, regenerating with water containing no Li$^+$ values, or containing only about 300 ppm Li$^+$ values causes degeneration of the 2-layer crystal to gibbsite, which contaminates the Li-containing effluent from the wash column.

Compounds made in accordance with the present disclosure are useful in selectively removing Li$^+$ values from aqueous solution and are also useful in exchanging of the anion (X) with other anions in aqueous solution. Of special interest is the removal of Li$^+$ values from natural brines, e.g., Smackover brine, and from ore leachings, e.g., Spodumene ore.

I claim:

1. A process for preparing crystalline 2-layer LiOH.2Al(OH)$_3$.nH$_2$O, said process comprising contacting crystalline 2-layer LiX.2Al(OH)$_3$.nH$_2$O with an aqueous solution of LiOH, or other hydroxide ion source, at a temperature in the range of about 15° C. to about 70° C., where X is halide, thereby exchanging OH$^-$ ions for X$^-$ ions and forming crystalline 2-layer LiOH.2Al(OH)$_3$.nH$_2$O.

2. The process of claim 1 wherein the concentration of the LiOH solution, or other hydroxide ion source, is in the range of about 5% to about saturation.

3. A process for replacing the X anion of crystalline 2-layer LiX.2Al(OH)$_3$.nH$_2$O with a larger anion, X', said process comprising reacting the LiX.2Al(OH)$_3$.nH$_2$O with LiOH, or other hydroxide ion source, at a temperature in the range of about 0° C. to about 100° C., thereby forming crystalline 2-layer LiOH.2Al(OH)$_3$.nH$_2$O, and reacting the so-formed LiOH.2Al(OH)$_3$.nH$_2$O with an acid or salt form of the larger X' anion, thereby forming crystalline 2-layer LiX'.2Al(OH)$_3$.nH$_2$O.

4. The process of claim 3 where the X anion is at least one of the group comprising chloride, bromide, and iodide and the X' anion is at least one of the group comprising NO$_3^-$, H$_2$PO$_4^-$, HPO$_4^{-2}$, PO$_4^{-3}$, HCOO$^-$, CClH$_2$COO$^-$, CCl$_2$HCOO$^-$, CCL$_3$COO$^-$, CH$_2$CHCOO$^-$, and C$_6$H$_5$O$^-$.

5. The process of claim 3 wherein the concentration of the LiOH solution, or other hydroxide ion source, is in the range of about 5% to about saturation and the temperature is in the range of about 15° C. to about 70° C.

6. The process of claim 3 wherein the LiX.2Al(OH)$_3$.nH$_2$O is supported by a substrate.

7. The process of claim 3 wherein the LiX.2Al(OH)$_3$.nH$_2$O is supported within the pores of a porous substrate.

8. The process of claim 3 wherein the LiX.2Al(OH)$_3$.nH$_2$O is supported within the pores of a macroporous ion exchange resin.

9. The process of claim 3 wherein the LiX.2Al(OH)$_3$.nH$_2$O is supported within the pores of a macroporous beads comprising a copolymer of styrene and divinylbenzene having pendant amine or quaternary ammonium groups.

* * * * *